(12) United States Patent
Yang et al.

(10) Patent No.: US 7,116,767 B2
(45) Date of Patent: Oct. 3, 2006

(54) APPARATUS AND METHOD FOR CONTROLLING TELEPHONE COMMUNICATIONS DURING INTERVALS OF HIGH CALL TRAFFIC VOLUME

(75) Inventors: ZhongJin Yang, Naperville, IL (US); Jie Yao, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 491 days.

(21) Appl. No.: 10/180,240

(22) Filed: Jun. 26, 2002

(65) Prior Publication Data

US 2004/0001577 A1    Jan. 1, 2004

(51) Int. Cl.
*H04M 15/00* (2006.01)
*H04M 7/00* (2006.01)

(52) U.S. Cl. ............................. 379/112.04; 379/112.05; 379/112.1; 379/221.07

(58) Field of Classification Search ............ 379/112.01, 379/112.04, 112.05, 112.1, 133–134, 32.01–32.05, 379/221.03, 221.06, 221.07; 370/229, 230, 370/232, 234, 235
See application file for complete search history.

(56) References Cited

U.S. PATENT DOCUMENTS

| | | | | |
|---|---|---|---|---|
| 5,450,483 | A * | 9/1995 | Williams | 379/112.04 |
| 5,896,447 | A * | 4/1999 | Bunge et al. | 379/196 |
| 6,097,697 | A * | 8/2000 | Yao et al. | 370/230 |
| 6,137,872 | A * | 10/2000 | Davitt et al. | 379/114.2 |
| 6,243,449 | B1 * | 6/2001 | Margulis et al. | 379/112.04 |
| 6,456,850 | B1 * | 9/2002 | Kim et al. | 455/453 |
| 6,731,740 | B1 * | 5/2004 | Choudhury et al. | 379/221.03 |
| 2005/0122900 | A1 * | 6/2005 | Tuulos et al. | 370/229 |

* cited by examiner

*Primary Examiner*—Quoc Tran

(57) ABSTRACT

An apparatus for controlling telephone communications through a communication switch during intervals of call traffic volume in excess of a threshold call traffic volume includes: (a) a call traffic volume sensing device coupled with the communication switch and measuring the call traffic volume during selected intervals; and (b) a call traffic control device coupled with at least one of the communication switch and the call traffic volume sensing device. The call traffic control device cooperates with the communication switch to involuntarily terminate selected calls through the communication switch when at least one selected parameter is exceeded. The at least one selected parameter includes the call traffic volume.

23 Claims, 2 Drawing Sheets

APPARATUS AND METHOD FOR CONTROLLING TELEPHONE COMMUNICATIONS DURING INTERVALS OF HIGH CALL TRAFFIC VOLUME

BACKGROUND

The present invention is directed to telecommunication network apparatuses and operations, and especially to telecommunication networks experiencing high call traffic volume. There are times when call traffic volume threatens to or actually does overwhelm the capabilities of a telecommunication network. Examples of such times of increased call activity are during special events such as a festival, or a holiday. Disaster may also occasion sharply increased use of a telecommunication network sufficiently to overwhelm the network. An overload situation caused by such increased traffic volume may be somewhat local in nature, as in the case of a disaster, or the situation may more generally apply throughout a larger expanse of the network, as in the case of a significant national holiday.

For example, an emergency condition or a local festival or another circumstance may cause a significant increase in the number of people seeking to place telephone calls. High call traffic volume and call congestion at a local switch may be overwhelmed if it is required to accommodate all of the calls at a given time. In order for a telecommunication service provider to permit a larger number of calls to be placed without having to increase the hardware installation at the local switch, an improved management of telecommunication resources is required. The present invention provides an apparatus and method for effecting improved management of telecommunication network resources in high call traffic volume conditions. In order to have a greater number of callers provided access to the telecommunication network, longer-duration calls are released, or terminated, in order to provide telecommunication network resources to other callers (for short duration calls).

There is a need for a system, or apparatus, and method for controlling telephone communications in a telecommunication network that avoids overloading the network.

There is a further need that such a communication controlling apparatus and method effect the requisite control without interrupting special calls, such as emergency service calls (commonly referred to as 9-1-1 calls).

SUMMARY OF THE INVENTION

An apparatus for controlling telephone communications through a communication switch during intervals of call traffic volume in excess of a threshold call traffic volume includes: (a) a call traffic volume sensing device coupled with the communication switch and measuring the call traffic volume during selected intervals; and (b) a call traffic control device coupled with at least one of the communication switch and the call traffic volume sensing device. The call traffic control device cooperates with the communication switch to involuntarily terminate selected calls through the communication switch when at least one selected parameter is exceeded. The at least one selected parameter includes the call traffic volume.

In another embodiment, the apparatus may further include: a call character sensing device coupled with at least one of the call traffic volume sensing device and the communication switch. The call character sensing device ascertains whether a respective call is a special call exempt from the involuntary terminating. In this embodiment, the selected parameters further include whether the respective call is a special call.

In yet another embodiment the apparatus may further include: a call termination message device coupled with at least one of the communication switch, the call traffic volume sensing device and the call traffic control device. The call termination message device alerts callers involved with a respective call before the respective call is involuntarily terminated. The alerting may be effected using at least one of an audio message, a video message and a data message.

A method for controlling telephone communications through a communication switch during intervals of call traffic volume in excess of a threshold call traffic volume includes the steps of: (a) ascertaining call traffic volume of extant call traffic to establish an extant call traffic volume; (b) comparing the extant call traffic volume with the threshold call traffic volume; (c) when the extant call traffic volume is in excess of the threshold call traffic volume, selecting at least one termination-candidate call from the extant call traffic; and (d) involuntarily terminating the at least one termination-candidate call.

In other embodiments, the method may include the further step of: repeating steps (a) through (d) until the extant call traffic volume is not in excess of the threshold call traffic volume or until the extant call traffic volume is a volume amount less than the threshold call traffic volume.

In yet other embodiments, the method may include one or more additional steps between step (c) and step (d), such as: (c)(1) ascertaining whether each respective termination-candidate call is a special call; (c)(2) if a respective termination-candidate call is a special call, exempting the special call from involuntary termination; and (c)(3) alerting callers involved with each respective termination-candidate call not exempted in step (c)(2) before effecting involuntary termination of the respective not exempted termination-candidate call.

It is therefore, an object of the present invention to provide an apparatus and method for controlling telephone communications during intervals of high call traffic volume in a network that avoids overloading of the network.

It is a further object of the present invention to provide an apparatus and method for controlling telephone communications during intervals of high call traffic volume in a network that effects the requisite call control without interrupting special calls, such as emergency service calls.

Further objects and features of the present invention will be apparent from the following specification and claims when considered in connection with the accompanying drawings, in which like elements are labeled using like reference numerals in the various figures, illustrating the preferred embodiments of the invention.

DETAILED DESCRIPTION OF THE PREFERRED EMBODIMENT

Figure 1:
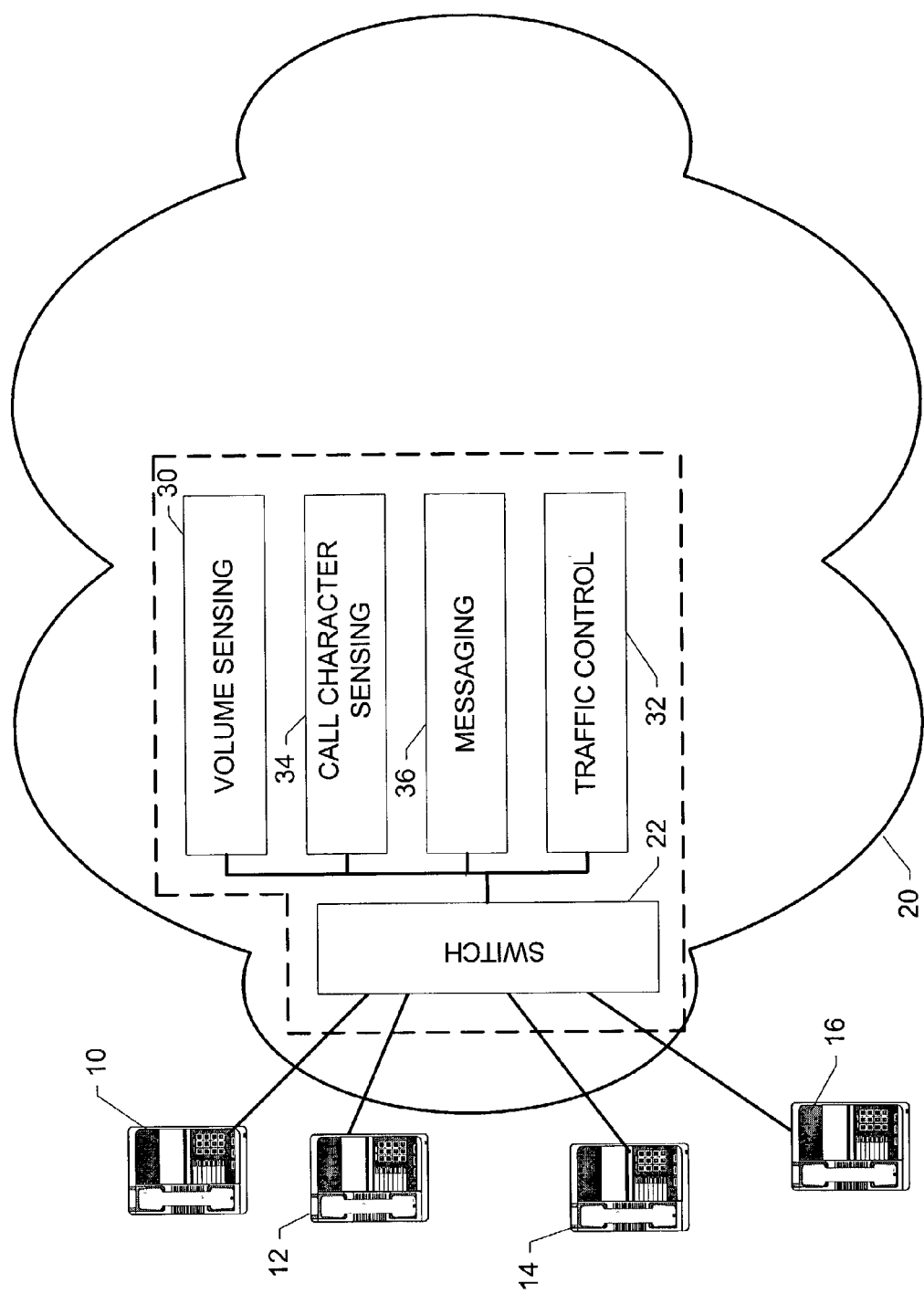
FIG. 1 is a schematic drawing illustrating a representative embodiment of the apparatus of the present invention deployed in a telecommunication network.

FIG. 1 is a schematic drawing illustrating a representative embodiment of the apparatus of the present invention deployed in a telecommunication network. In FIG. 1, a plurality of telephone user instruments 10, 12, 14, 16 effect calls in a telephone network 20, such as a Public Switched Telephone Network (PSTN). Access to telephone network 20 by telephone instruments 10, 12, 14, 16 is established via a telecommunication switch 22. Telephone network 20 may include any telecommunication network, including by way of example and not by way of limitation wireless networks, voice networks, private branch exchange networks, data networks, optical networks and other telecommunication networks.

Coupled with telecommunication switch 22 is a call traffic volume sensing device 30. Call traffic volume sensing device 30 measures call traffic volume during selected time intervals to ascertain then extant traffic volume. Call traffic volume sensing device 30 may be configured for continuously measuring call traffic volume or operation of call traffic sensing device 30 may be controlled from a remote location. For example, call traffic volume sensing device 30 may be enabled from a remote location such as a telephone service provider central office (CO; not shown in FIG. 1) or from a Public Safety Answering Position (PSAP; not shown in FIG. 1) when it is anticipated that periods of high call traffic volume may occur, such as during holiday periods or during emergency situations.

Call traffic volume may be measured by call traffic volume sensing device 30 in any of various volume-indicating units, or combinations of units. Such units may include, by way of example and not by way of limitation, Erlangs, numbers of calls, an indicator combining numbers of calls and their respective call durations, or another call volume indication or combination of indications. An Erlang is a measure of telephone traffic. One Erlang is equal to one full hour of telephone use, or 60×60=3600 seconds of telephone use.

Also coupled with telecommunication switch 22 is a call traffic control device 32. Call traffic control device 32 cooperates with telecommunication switch 22 and with call traffic volume sensing device 30 to involuntarily terminate selected calls (termination-candidate calls) from telephone instruments 10, 12, 14, 16 through telecommunication switch 22 when selected parameters, such as call traffic volume, are exceeded. Preferably, calls that have been established longest may be first selected as termination-candidate calls (i.e., on a "first-in-first-out" basis). It is also preferred that call duration be factored into the selection of respective calls as termination-candidate calls. However, other criteria may be employed within the scope of the present invention for determining which extant calls are selected as termination-candidate calls.

Further coupled with telecommunication switch 22 is a call character sensing device 34. Call character sensing device 32 ascertains whether a respective call is a special call that is exempt from involuntary termination. Certain calls, such as emergency service calls (i.e., 9-1-1 calls), or telephone maintenance service calls (i.e., 6-1-1 calls) should be given priority over other calls. Such priority handling may be an imperative in some high call traffic situations, such as during emergency situations like floods and earthquakes. The character of a respective call may be ascertained by any appropriate means within the scope of the present invention, including by way of example and not by way of limitation, special number dialed calls (e.g., 9-1-1 calls) or telephone call routing information (e.g., SS-7 signaling that used by telecommunication switches for routing calls to their respective destinations) or other information contained within the called number or call routing information or information otherwise accompanying the respective call.

Still further coupled with telecommunication switch 22 is a call termination message device 36. Call termination message device 36 alerts callers involved with a respective call before the respective call is involuntarily terminated. It is preferred that at least one of the called party and the calling party be alerted by call termination message device 36. Most preferably, all parties to a respective call are alerted before the respective call is involuntarily terminated. The alerting may be carried out using one or more of an audio message, a video message, a data message or another alerting medium.

Any one or all of call traffic volume sensing device 30, call traffic control device 32, call character sensing device 34 and call termination message device 36 may be embodied in an independent entity or device coupled with other devices as required and as generally described hereinabove. Alternately, any of call traffic volume sensing device 30, call traffic control device 32, call character sensing device 34 and call termination message device 36 may be individually or collectively in any combination included with telecommunication switch 22 as an integral unit within a single housing and, indeed, even upon a single backplane or substrate. This possible unified configuration is indicated by the dotted line in FIG. 1 surrounding call traffic volume sensing device 30, call traffic control device 32, call character sensing device 34, call termination message device 36 and telecommunication switch 22.

Telecommunication switch 22 is a representative switch through which calls by telephone instruments 10, 12, 14, 16 are routed in accessing telephone network 20. The present invention is only representatively illustrated as being embodied in the nearest telecommunication switch to telephone instruments 10, 12, 14, 16. The present invention may be embodied in any telecommunication switch within telecommunication network 20 (other telecommunication switches in telecommunication network 20 are not shown in FIG. 1). Indeed, it is preferred that the present invention be embodied in all telecommunication switches in telecommunication network 20 in order that local conditions may be accommodated in controlling call traffic when circumstances indicate a need to do so. For example, a forest fire in Colorado is an emergency that may generate sufficient call traffic volume to recommend using the present invention. However in Florida call traffic volume may be at normal levels. Yet Florida caller in a telephone conversation with someone in Colorado may find that the call is involuntarily terminated by an implementation of the present invention in a telecommunication switch in Colorado near the forest fire.

Figure 2:
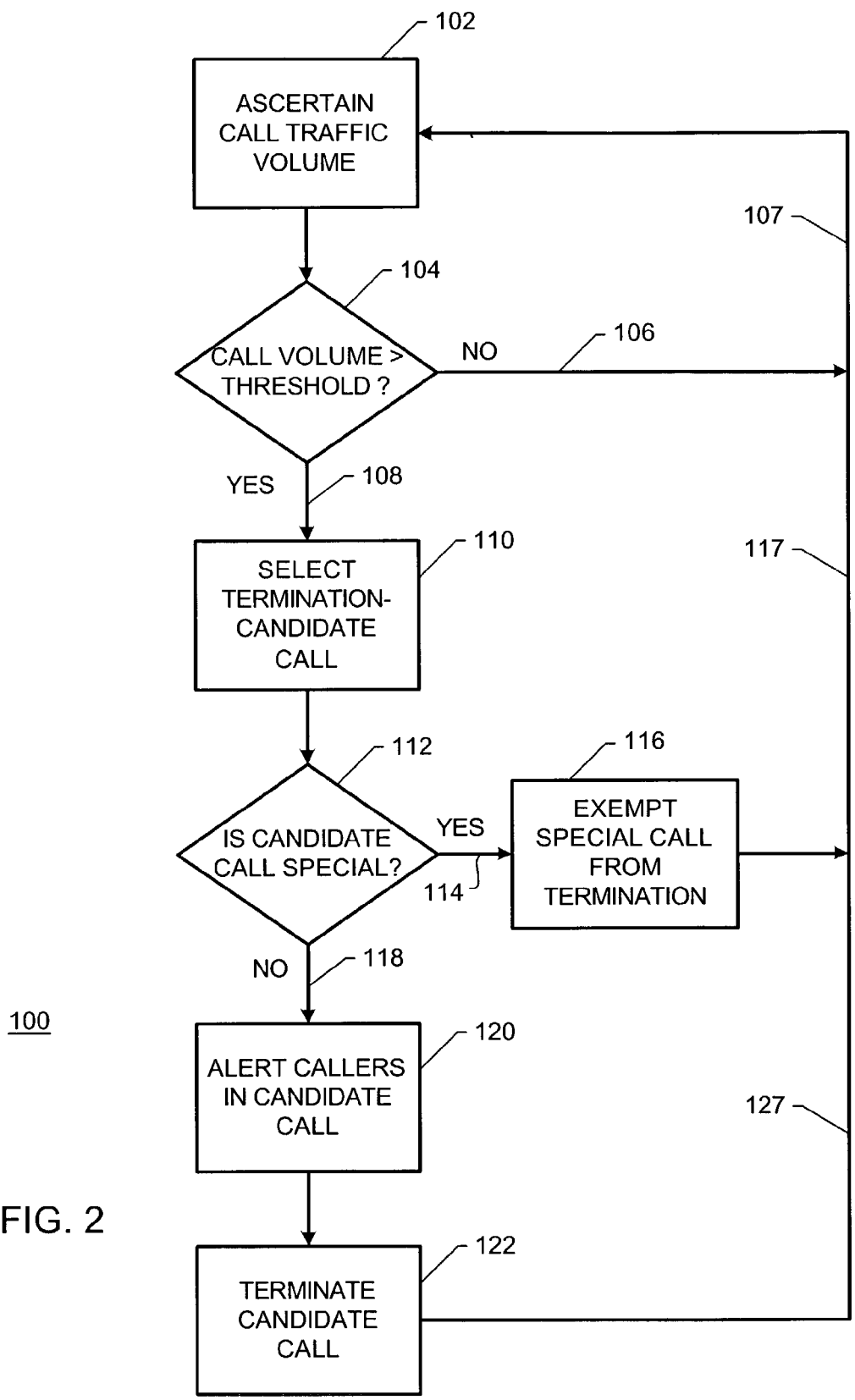
FIG. 2 is a flow diagram illustrating the method of the present invention.

FIG. 2 is a flow diagram illustrating the method of the present invention. In FIG. 2, a method 100 for controlling telephone communications through a communication switch during intervals of call traffic volume in excess of a threshold call traffic volume begins with ascertaining call traffic volume of extant call traffic to establish an extant call traffic volume, as indicated by a block 102.

Method 100 continues by comparing the extant call traffic volume with the threshold call traffic volume and poses a query whether the extant call traffic volume is in excess of the threshold call traffic volume, as indicated by a query block 104. If the extant call traffic volume is not in excess of the threshold call traffic volume, method 100 proceeds according to NO response line 106 to return to block 102 via line 107 to continue ascertaining call traffic volume of extant call traffic to establish an extant call traffic volume. If the extant call traffic volume is in excess of the threshold call traffic volume, method 100 proceeds according to YES response line 108 to select at least one termination-candidate call from the extant call traffic, as indicated by a block 110.

Method 100 continues by posing a query whether each respective termination-candidate call of the at least one termination-candidate call is a special call, as indicated by a query block 112. If a respective termination-candidate call is a special call (e.g., an emergency service call) then method 100 proceeds via YES response line 114 and the call is exempted from involuntary termination, as indicated by a block 116. Method 100 then returns to block 102 via lines 117, 107 to continue ascertaining call traffic volume of extant call traffic to establish an extant call traffic volume. If a respective termination-candidate call is not a special call method 100 proceeds via NO response line 118 to alert callers (as indicated by a block 120) involved with each respective termination-candidate call not exempted according to block 116 before effecting involuntary termination of the respective not exempted termination-candidate call, as indicated by a block 122. Method 100 thereafter returns to block 102 via lines 127, 117, 107 to continue ascertaining call traffic volume of extant call traffic to establish an extant call traffic volume.

Method 100 may be implemented on a basis of continually ascertaining call traffic volume of extant call traffic (block 102) or method 100 may be selectively implemented by a service provider (e.g., a telephone company), for example at a respective telecommunication switch or at a central office. Method 10 could also be implemented selectively by remote control from a Public Safety Answering Position (PSAP) in an emergency service network.

Method 100 may be implemented to identify and characterize (i.e., determine whether the call or calls are special calls appropriate for exemption from involuntary termination) for individual phone calls one at a time or for call groups. It is for this reason, for example, that block 110 is described as relating to at least one termination-candidate call.

The provision of return lines 127, 117, 107 in FIG. 2 is intended to indicate that method 100 may be practiced in a recurring manner so that steps represented by blocks 102, 104, 110, 112 116, 120, 122 may be carried out in repeated fashioned so long as the answer to the query posed by query block 104 is YES. That is, so long as the extant call traffic volume is in excess of the threshold call traffic volume. It may be desirable to infuse a measure of hysteresis to the practice of method 100 by ensuring that repeated practice of steps represented by blocks 102, 104, 110, 112 116, 120, 122 continues until the extant call traffic volume is less that the threshold call traffic volume by a predetermined (hysteresis) amount.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims:

We claim:

1. An apparatus for controlling telephone communications through a communication switch during intervals of call traffic volume of extant call traffic in excess of a threshold call traffic volume of extant call traffic; the apparatus comprising:

a) a call traffic volume sensing device coupled with said communication switch; said call traffic volume sensing device measuring said call traffic volume during selected intervals; and a threshold call traffic volume; and b) a call traffic control device coupled with at least one of said communication switch and said call traffic volume sensing device; said call traffic control device cooperating with said communication switch to involuntarily terminate selected extant calls through said communication switch when a single parameter is exceeded; said single parameter including said call traffic volume, and a hysteresis such that said call traffic volume is reduced to a volume amount less than a volume amount defined by said single parameter and such that the call traffic volume is less then the threshold call traffic volume by a predetermined hysteresis amount.

2. An apparatus for controlling telephone communications through a communication switch as recited in claim 1 wherein the apparatus further comprises:

c) a call character sensing device coupled with at least one of said call traffic volume sensing device and said communication switch; said call character sensing device ascertaining whether a respective call is a special call exempt from said involuntary terminating said selected parameters further including whether said respective call is a special call.

3. An apparatus for controlling telephone communications through a communication switch as recited in claim 1 wherein the apparatus further comprises:

c) a call termination message device coupled with at least one of said communication switch, said call traffic volume sensing device and said call traffic control device; said call termination message device alerting callers involved with a respective said call before said respective call is involuntarily terminated.

4. An apparatus for controlling telephone communications through a communication switch as recited in claim 2 wherein the apparatus further comprises:

d) a call termination message device coupled with at least one of said communication switch, said call traffic volume sensing device, said call traffic control device and said call character sensing device; said call termination message device alerting callers involved with a respective said call before said respective call is involuntarily terminated.

5. An apparatus for controlling telephone communications through a communication switch as recited in claim 3 wherein said alerting is effected using at least one of an audio message, a video message and a data message.

6. An apparatus for controlling telephone communications through a communication switch as recited in claim 4 wherein said alerting is effected using at least one of an audio message, a video message and a data message.

7. A method for controlling telephone communications through a communication switch during intervals of call traffic volume of extant call traffic in excess of a threshold call traffic volume of extant call traffic; the method comprising the steps of:

a) ascertaining call traffic volume of extant call traffic to establish an extant call traffic volume;

b) comparing said extant call traffic volume with a single-threshold call traffic volume;

c) when said extant call traffic volume is in excess of said single threshold call traffic volume, selecting at least one termination-candidate call from said extant call traffic; and d) involuntarily terminating said at least one termination-candidate call; and e) repeating steps (a) through (d) until said extant call traffic volume is not in excess of said single threshold call traffic volume such that the repeating of steps (a) trough (d) has a hysteresis and such that the extant call traffic volume is less that the threshold call traffic volume by a predetermined hysteresis amount.

8. A method for controlling telephone communications through a communication switch as recited in claim 7 wherein the method further comprises the step of:
   e) repeating steps (a) through (d) until said extant call traffic volume is a volume amount less than said threshold call traffic volume.

9. A method for controlling telephone communications through a communication switch as recited in claim 7 wherein the method includes additional steps between step (e) and step (d):
   (c)(1) ascertaining whether each respective said at least one termination-candidate call is a special call; and
   (c)(2) if a respective said at least one termination-candidate call is a special call, exempting said special call from involuntary termination.

10. A method for controlling telephone communications through a communication switch as recited in claim 7 wherein the method includes an additional step between step (c) and step, (d):
    (c)(1) alerting callers involved with each respective said at least one termination-candidate call before effecting involuntary termination of said respective termination-candidate call.

11. A method for controlling telephone communications through a communication switch as recited in claim 9 wherein the method includes an additional step between step (c)(2) and step (d):
    (c)(3) alerting callers involved, with each respective said at least one termination-candidate call not exempted in step (c)(2) before effecting involuntary termination of said respective not exempted termination-candidate call.

12. A Method for controlling telephone communications through a communication switch as recited in claim 9 wherein the method further comprises the step of:
    (e) repeating steps (a) through (d) until said extant call traffic volume is not in excess of said threshold call traffic volume.

13. A method for controlling telephone communications through a communication switch as recited in claim 10 wherein the method further comprises the step of:
    (e) repeating steps (a) through (d) until said extant call traffic volume is not in excess of said threshold call traffic volume.

14. A method for controlling telephone communications through a communication switch as recited in claim 11 wherein the method further comprises the step of:
    (e) repeating steps (a) through (d) until said extant call traffic volume is not in excess of said threshold call traffic volume.

15. A method for controlling telephone communications trough a communication switch as recited in claim 9 wherein the method further comprises the step of:
    (e) repeating steps (a) through (d) until said extant call traffic volume is a volume amount less than said threshold call traffic volume.

16. A method for controlling telephone communications through a communication switch as recited in claim 10 wherein the method further comprises the step of:
    (e) repeating steps (a) through (d) until said extant call traffic volume is a volume amount less than said threshold call traffic volume.

17. A method for controlling telephone communications through a communication switch as recited in claim 11 wherein the method further comprises the step of:
    (e) repeating steps (a) through (d) until said extant call traffic volume is a volume amount less than said threshold call traffic volume.

18. A method for controlling telephone communications in a communication system during intervals of call traffic volume in excess of a threshold call traffic volume; said communication system including a plurality of communication switches interconnected to participate in a communication network; the method comprising the steps of, in at least one respective communication switch of said plurality of communication switches:
    a) ascertaining call traffic volume of extant call traffic to establish an extant call traffic volume;
    b) comparing said extant call traffic volume with a single threshold call traffic volume;
    c) when said extant call traffic volume is in excess of said single threshold call traffic volume, select at least one termination-candidate call from said extant call traffic;
    d) ascertaining whether each respective said at least one termination-candidate call is a special call;
    e) if a respective said at least one termination-candidate call is a special call, exempting said special call from involuntary termination;
    f) alerting callers involved with each respective said at least one termination-candidate call not exempted in step (e) before effecting involuntary termination of said respective not exempted termination-candidate call;
    g) involuntarily terminating said at least one not exempted termination-candidate call; and
    h) repeating steps (a) through (g) until said extant call traffic volume is not in excess of said threshold call traffic volume such that the repeating of steps (a) through (g) has a hysteresis and such that the extant call traffic volume is less that the threshold call traffic volume by a predetermined hysteresis amount.

19. A method for controlling telephone communications in a communication system as recited in claim 18 wherein the method further comprises the step of:
    (i) repeating steps (a) through (g) until said extant call traffic volume is a call volume amount less than said threshold call traffic volume.

20. A method for controlling telephone communications in a communication system as recited in claim 18 wherein said step of alerting callers involved with each respective said at least one termination comprises delivering a call termination message alerting callers that their call is about to be involuntarily terminated.

21. A method for controlling telephone communications in a communication system as recited in claim 20 wherein said step of delivering a call termination message comprises the step of delivering an audio message.

22. A method for controlling telephone communications in a communication system as recited in claim 20 wherein said step of delivering a call termination message comprises the step of delivering a video message.

23. A method for controlling telephone communications in a communication system as recited in claim 20 wherein said step of delivering a call termination message comprises the step of delivering a data message.

* * * * *